Figure 1:
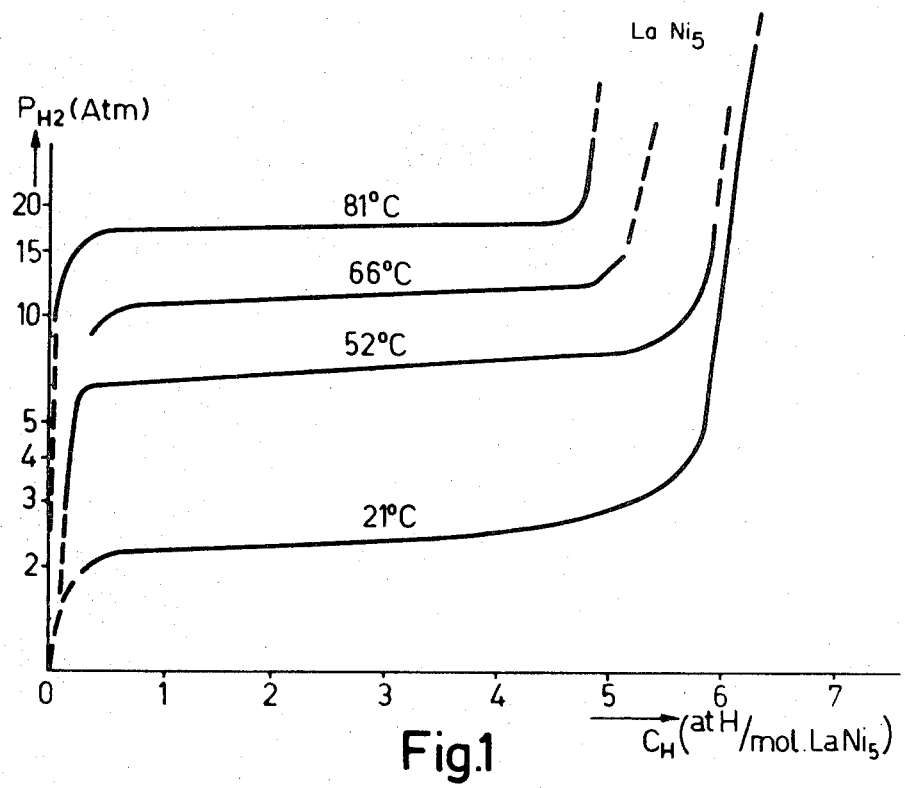

# United States Patent [19]
Meijer

[11] 3,732,690
[45] May 15, 1973

[54] DEVICE FOR CONVERTING CALORIFIC ENERGY INTO MECHANICAL ENERGY
[75] Inventor: Roelf Jan Meijer, Emmasingel, Netherlands
[73] Assignee: U.S. Philips Corporation, New York, N.Y.
[22] Filed: Feb. 22, 1971
[21] Appl. No.: 117,503

[30] Foreign Application Priority Data
Mar. 6, 1970 Netherlands.....................7003201

[52] U.S. Cl..................60/39.46, 48/190, 55/74, 60/24, 123/1 A, 123/119 E, 148/152, 206/0.7, 252/462, 252/473
[51] Int. Cl..........F02g 1/00, F17c 11/00, F17d 1/04
[58] Field of Search..........................48/190; 206/0.7; 60/39.46, 39.02, 39.06; 123/1 A, 119 E; 148/152; 252/462, 473; 23/210; 55/16, 158

[56] References Cited
UNITED STATES PATENTS
2,712,730   7/1955   Spangler.........................48/190 X
3,479,165   11/1969  Lyon................................48/190

FOREIGN PATENTS OR APPLICATIONS
965,454   7/1964   Great Britain..................123/119 E Primary Examiner—Joseph Scovronek
Attorney—Frank R. Trifari

[57] ABSTRACT

A device such as hot-gas engines, hot-gas turbine, and internal combustion engine for converting calorific energy into mechanical energy comprising at least one combustion chamber for hydrogen and at least one cooler incorporated in a system of ducts for cooling medium; the combustion chamber can be made to communicate with a hydrogen container containing an alloy of A and B, in which the ratio A:B can vary from 1:3 to 2:17 in powder form, where A is Ca or one or more of the elements of the rare earths, combined with Th and/or Zr and/or Hf, and where B is mainly Ni and/or Co. The hydrogen container and a part of the system of ducts are constructed for heat exchange between the alloy in the hydrogen container and the medium in the system of ducts.

5 Claims, 4 Drawing Figures

DEVICE FOR CONVERTING CALORIFIC ENERGY INTO MECHANICAL ENERGY

The invention relates to a device for converting calorific energy into mechanical energy, in particular a hot-gas engine, comprising at least one combustion chamber which communicates with at least one inlet duct for hydrogen, and furthermore comprising at least one cooler which is incorporated in a system of ducts for cooling medium, with a pumping device also incorporated in the system.

Devices of this type are known and they are formed, by hot-gas turbines, internal combustion engines and the like in addition to hot-gas reciprocating engine.

The system of ducts may form a closed circuit or an open circuit. In the first case a radiator is usually present between the inlet and the outlet of the system of ducts. Cooling medium, for example water, circulated in the system of ducts by the pumping device absorbs in the cooler thermal energy to be removed from the device and delivers said thermal energy subsequently in the radiator to the ambient air.

An open system of ducts is sometimes used on board vessels. In this case the water of the fairway serves as a cooling medium which is sucked in by the pumping device, is conducted through the cooler where it absorbs thermal energy from the device, and is then exhausted in the fairway water as hot water.

The use of hydrogen as a fuel for the device is known from Dutch patent specification 72,034 and presents the advantage that the exhaust gases of the device are clean due to the absence of unburnt hydrocarbons and carbon monoxides which both are detrimental to health.

Notably, the use of hydrogen as a fuel is advantageous in hot-gas engines having a closed thermodynamic cycle, for example, hot-gas engines and hot-gas turbines, because in this case the quantity of nitrogen oxides in the exhaust gases which are also detrimental to health is comparatively low. As compared, for example, with internal combustion engines, the quantity of formed nitrogen oxides is at least a few factors lower.

As a result of this, such hydrogen-operated engines are extremely suitable for use in places where pollution of air is to be minimized.

Such places include not only factory and storage spaces, mines, and the like, in which the engine can be arranged stationary or is present as a source of energy in vehicles, and in which spaces special ventilation means are normally required owing to the air pollution, but also cities with their large population concentrations and numerous vehicles producing gases which are detrimental to health.

A problem in the known device is the hydrogen supply. Vehicles, vessels and air-craft equipped with engines or gas turbines which are hydrogen-operated have only a restricted range of action as a result of the comparatively small quantity of hydrogen which can be carried along as a storage in a hydrogen tank. This is caused by the fact that: (a) the dimensions of the tank, for spatial reasons, should remain restricted, and (b) the pressure of the hydrogen in the tank cannot be increased arbitrarily high without the danger of explosion; to avoid this danger would necessitate the use of extremely thick tank walls resulting in a great weight of the tank.

The hydrogen tank should be refilled after a comparatively short time. Supplying the tank is a comparatively expensive and complicated matter because compressors should be used which either compress the hydrogen previously and force it into a high-pressure storage container from which it can be conducted into the hydrogen tank at a later instant, or compress low-pressure hydrogen and simultaneously force the compressed hydrogen into the hydrogen tank.

It is the object of the present invention to provide a device for converting calorific energy into mechanical energy in which the above-described drawbacks are avoided and in which the cooling system of the device is advantageously used both on filling the hydrogen tank and during the discharge of hydrogen from the tank to the combustion chamber of the device during operation.

For that purpose, the device according to the invention is characterized in that the side of the inlet duct for hydrogen remote from the combustion chamber can be made to communicate with a hydrogen container in which an alloy of A and B is present in which the ratio A:B may vary from 1:3 to 2:17 in powder form, where A is Ca or one or more of the elements of the rare earths, possibly combined with Th and/or Zr and/or Hf, and where B is mainly Ni and/or Co, the hydrogen container and a part of the system of ducts being suitable for exchanging thermal energy between the alloy in the hydrogen container and the medium in the system of ducts. It is to be noted that in connection with the present application the element Y is assumed to be among the elements of the rare earths.

It has surprisingly been found that the alloy AB has the property of being capable of absorbing very large quantities of hydrogen gas at room temperatures and at comparatively low pressures. For example, 0.080 g of hydrogen gas is absorbed by 1 $cm^3$ $LaNi_5$ powder having a packing density of 65 percent at a hydrogen gas pressure of 5 atmospheres and at a temperature of approximately 40° C. The density of the hydrogen gas in the alloys may be of the order of magnitude of that of liquid hydrogen and more.

Isotherms can be drawn for each of the alloys associated with the group AB in a diagram in which the hydrogen gas pressure $P_{H2}$ is plotted on the vertical axis and the absorbed quantity of hydrogen $C_H$ is plotted on the horizontal axis. At a given pressure, each isotherm has a horizontal course, the so-called "plateau." At the plateau pressure it is possible, by means of a small pressure variation, to cause comparatively much hydrogen gas to be absorbed or to be given off in a reversible process.

In the graph of FIG. 1 the course of the said isotherms is shown for $LaNi_5$. The hydrogen gas can be absorbed very rapidly in the material and also be recovered again very rapidly from the material.

Figure 2:
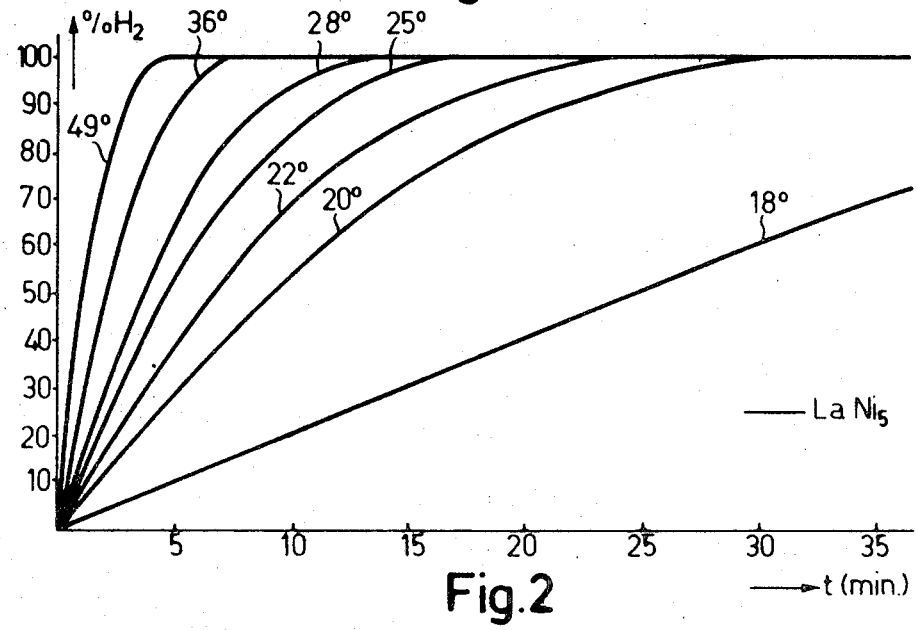

The graph of FIG. 2 shows how at various working temperatures and at an outside pressure of 1 atm. for $LaNi_5$ the quantity of outflowed hydrogen gas depends upon time. It is of great advantage when using said materials in the device according to the invention that large quantities of hydrogen gas are absorbed at temperatures which lie at or near the room temperature level, while the corresponding hydrogen pressures at these temperatures are low and may be only a few atmospheres. This means that in a hydrogen container of small dimensions containing the alloy AB a large quantity of hydrogen can be stored at room temperature and at a low pressure.

In addition to savings in volume and weight of the hydrogen tank, a considerably larger range of action of vehicles, vessels and air-craft comprising a hydrogen-operated source of energy is obtained in this manner, while owing to the low hydrogen pressure in the container the danger of explosion is minimized. Should in certain circumstances leakage of the hydrogen container occur, the container will be cooled as a result of the flowing out of hydrogen to the atmosphere. The resulting fall in temperature of the container results in a decrease of the hydrogen pressure level in the container as can be seen from FIG. 1, so that upon reaching atmospheric pressure the outflow of hydrogen is discontinued automatically. So the hydrogen container has a fine self-safeguarding effect. Filling of the container can be carried out at low pressure, so that compressors are no longer necessary.

In addition, the device according to the invention advantageously uses its cooling system during the absorption and desorption of hydrogen in the hydrogen container. For that purpose, a part of the system of ducts is suitable for exchanging heat between the alloy in the hydrogen container and the medium in the system of ducts. Upon filling the hydrogen container, said medium may be used as a cooling medium by absorbing the heat of absorption released in the container and removing it, while during operation of the device the medium heated in the cooler can effectively be used for heating purposes by supplying the heat of desorption which is necessary for releasing hydrogen gas from the alloy in the container. In a closed system of ducts which comprises a radiator, said radiator may be constructed so as to be small because actually a part of the cooling medium thermal energy is delivered to the hydrogen container. Alternatively it is possible to increase the efficiency and power of the device by returning cooling water of lower temperature to the device. By using means which are mainly present already, a simple, cheap and reliable construction for the hydrogen storage and hydrogen discharge is obtained.

In a preferred embodiment of the device according to the invention, the hydrogen container contains one of the alloys $LaNi_5$; $La_{0.8}Y_{0.2}Ni_5$; $La_{0.9}Zr_{0.1}Ni_5$; $La_{x-}Ce_{1-x}Ni_5$, where $0.4 < x < 1$; $XYNi$ where $XY$ is an alloy comprising 85 percent by weight of La, 10 percent by weight of Nd, 4 percent by weight of Pr and 1 percent by weight of Ce.

In particular these alloys have proved to possess extremely good absorbing and desorbing properties for hydrogen gas. It is to be noted that Ni and/or Co can be partly replaced by a few other elements such as Fe, Cu, and so on, without the properties as regards the absorption and giving off of hydrogen gas strongly deteriorating.

In order that the invention may be readily carried into effect, two embodiments of the device will now be described in greater detail with reference to the diagrammatic FIGS. 3 and 4 of the accompanying drawing which are not drawn to scale.

Figure 3:
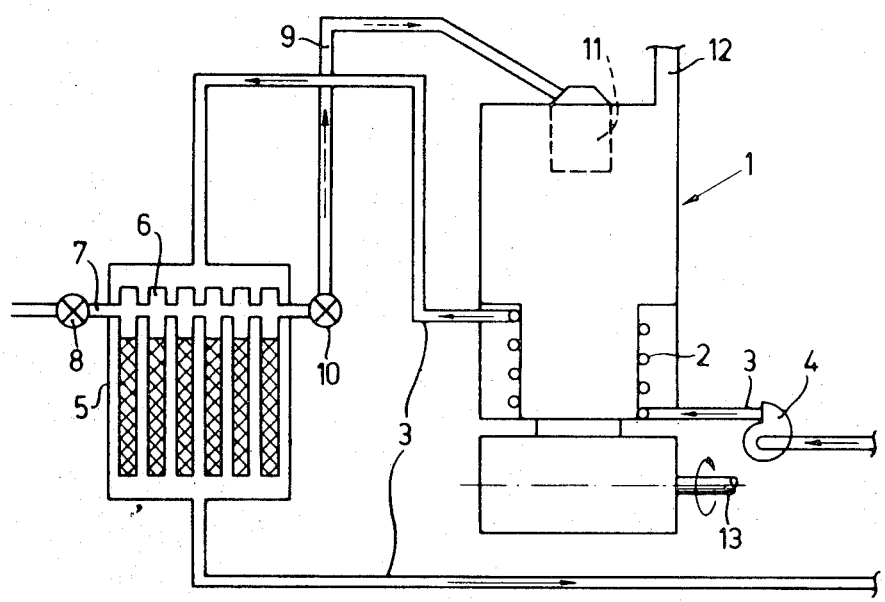

Reference numeral 1 in FIG. 3 denotes a hot-gas engine having a closed thermodynamic cycle.

The engine comprises a cooler 2 which is accommodated in an open system of ducts 3 having a pumping device 4.

A part of the system of ducts has a widened construction. In the widening 5 of a container 6 is accommodated which contains very fine powder of $LaNi_5$. The container 6 can be made to communicate with a hydrogen supply via a duct 7 which is passed through the wall of the widening and comprises a cock 8. Via a further duct 9 which is also passed through the wall of the widening and which comprises a cock 10 the container communicates with a combustion chamber 11 of the engine. An outlet 12 for exhaust gases communicates with the combustion chamber.

The operation of the device is as follows: During operation of the engine, cooling water is pumped through the system of ducts 3 by the pumping device 4 in the direction denoted by the solid-line arrows. The cooling water absorbs thermal energy from the engine in the cooler 2, delivers said thermal energy at least partly in the widening 5 to the hydrogen container 6, and is then removed.

The thermal energy supplied to the hydrogen container is used to desorb hydrogen absorbed in the $LaNi_5$ powder. When the hydrogen container is heated to a temperature of, for example, 40° C it may be seen from the graph of FIG. 1 that the pressure in the container will be approximately 5 atm. In the closed position of the cock 8 and the open position of the cock 10, hydrogen will flow from the container 6 via the duct 9 to the combustion chamber 11 and be burnt there.

When the hydrogen container 6 is to be filled, the duct 7 is made to communicate with the hydrogen source and cock 8 is opened. The cooling water system can now advantageously by used for removing from the hydrogen container the heat absorbed during operation. When the engine is not in operation, and with the pumping device not coupled to the shaft 13 of the engine but driven, for example, by means of an electric motor, no further measures need be taken. When the cooling water originating from the cooler 2 has such a high temperature that it cannot cool the hydrogen container during the filling process, the action of the pumping device may be reversed, for example, so that cooling water is sucked in. This water first passes the widening 6, and only subsequently the engine. Of course, in addition to reversing the action of the pumping device, a large number of other possibilities is available, so that during filling comparatively cold water flows through the widening 5. For example, a part of the sucked-in cooling water can be conducted along the cooler via a bypass duct and be mixed with warm water originating from the cooler, or a bypass duct in which a radiator is present can be made to communicate with the part of the duct present between the cooler 2 and the hydrogen container 6. During filling the hydrogen container, warm cooling water from the cooler 2 can be conducted through said radiator, can deliver thermal energy to the ambient air, and enter the widening 5 while cooled. However, such solutions require extra structural measures.

Figure 4:
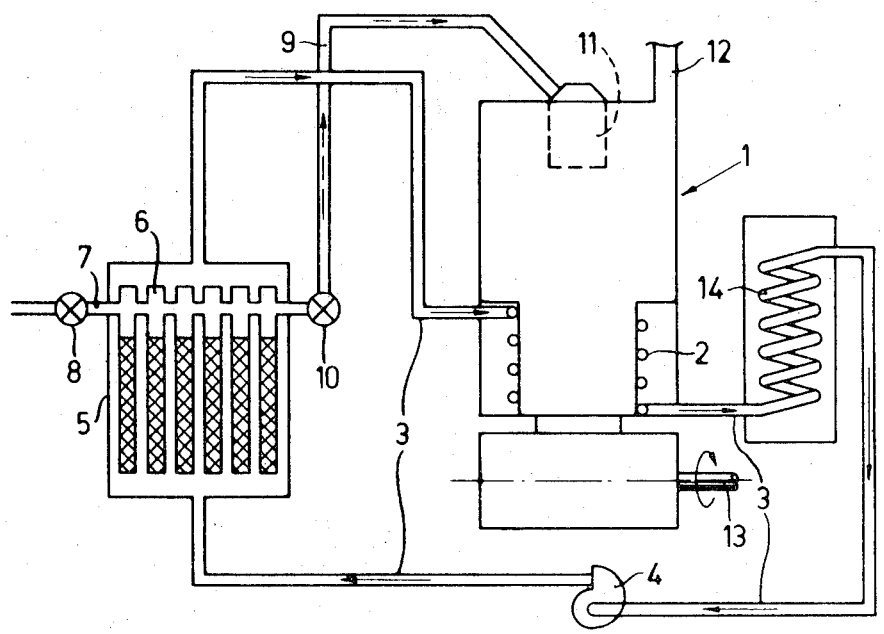

The device shown in FIG. 4 differs essentially from that shown in FIG. 3 only in that in the present case a closed cooling system is present in which the cooling water is circulated. A radiator 14 is incorporated in the closed system of ducts. For corresponding components the same reference numerals are used as in FIG. 3.

During operation of the device, cooling water is circulated by the pumping device 4 in the direction denoted by the solid-line arrows. Thermal energy absorbed in the cooler 2 from the device is delivered by the cooling water partly in the radiator 14 to the ambient air and partly in the widening 5 to the hydrogen container 6. The hydrogen desorbed by the heating of said container flows again via duct 9 to the combustion chamber 11. When, for example, the hydrogen container is heated to 20° C, the hydrogen pressure will be approximately 2.5 atmospheres as may be seen again from FIG. 1. The cooling water originating from the widening 5 then again arrives in the cooler 2 with a low temperature.

In the known closed cooling systems the radiator should be constructed rather large so as to be able to deliver all the thermal energy absorbed by the cooling water from the device in said radiator to the ambient air. Since in the present case a part of the thermal energy in the cooling water is used for desorbing hydrogen, the advantage of a compact construction of the radiator 14 is obtained.

On the other hand it may be advantageous in the hotgas engine, to maintain the comparatively large radiator. The cooling water from the radiator will then desorb the hydrogen at lower temperature and hence at lower hydrogen pressure from the $LaNi_5$. Cooling water from the widening 5 now enters the cooler 2 at a lower temperature which favorably influences the efficiency and power of the hot-gas engine.

Since in the hot-gas engine the thermal energy absorbed by the cooling water in the cooler is directly dependent upon the power supplied by the engine, always so much thermal energy can be supplied to the hydrogen container as is necessary for the desorption of the quantity of hydrogen to be supplied.

During the filling of the hydrogen container the cooling water, when the engine is not in operation, can be used again, as in the device shown in FIG. 3, to remove the releasing heat of absorption from said container.

If, however, the cooling water again has a comparatively high temperature due to operation of the engine, one of the measures may be taken which are mentioned in the description of the device shown in FIG. 3, so as to ensure that the cooling water enters the widening 5 at a comparatively low temperature.

In the direction of flow of the cooling water denoted in FIG. 4 by solid-line arrows, cooling water from the cooler 2 first flows through the radiator 14 and then through the widening 5. Of course it is also possible to cause the cooling water to circulate in the opposite direction during operation of the engine. However, this is less attractive on the one hand because the hydrogen container is heated to a comparatively high temperature, which involves a comparatively high hydrogen pressure, and on the other hand because the temperature difference between the cooling water in the radiator 14 and the ambient air is comparatively small which is unfavorable for the heat delivery to said ambient air. The radiator must then be constructed to be large again so as to prevent cooling water from reaching the engine in a comparatively warm state.

In the embodiments described, the hydrogen container is accommodated in a widening of the system of ducts. Of course other constructions are also possible. For example, the system of ducts may be built up at the region of the hydrogen container, for example, from a number of parallel pipes which are passed through the hydrogen container, the cooling medium flowing through said pipes.

From the above, it may be obvious that the invention provides an extremely attractive hydrogen-operated device for converting calorific energy into mechanical energy, in which a large quantity of hydrogen at a low pressure and at room temperature can be stored in a storage container of small dimensions and in which the cooling system of the device is efficiently used during the suppletion of hydrogen to the combustion chamber of the device and upon filling the hydrogen container.

What is claimed is:

1. In combination with a hot gas engine including a combustion chamber and a cooler, and operable with a source of $H_2$ and a source of heat transfer medium, a heating system comprising a container for $H_2$ including inlet and outlet means, means for flowing said $H_2$ from the container to the combustion chamber, means for flowing said medium from the source thereof to said cooler where the medium is heated, means for flowing said heated medium to said container for heating same, means for flowing said medium from the container to said source thereof, the container having therein an alloy capable of absorbing large quantities of $H_2$ gas at room temperature and at low pressures, said alloy consisting essentially of A and B where the ratio of A to B is about 1:3 to 2:17 in powder form, and A is at least one element selected from the group consisting of calcium and the rare earth elements, and B is at least one element selected from the group consisting of Ni and Co, whereby said alloy desorbs said $H_2$ therein when heated by said medium, and $H_2$ flows to said combustion chamber.

2. For use with a hot gas engine including a combustion chamber and a cooler, and operable with a source of $H_2$ and a source of heat transfer medium, a heating system comprising a container for $H_2$ including inlet and outlet means, means for flowing said $H_2$ from the container to the combustion chamber, the apparatus further comprising a radiator for heat exchange with ambient air, a closed duct system comprising means for flowing said medium to the cooler where it is heated and then to the radiator where it is partially cooled, and then to the container where it is further cooled thus heating said container and contents therein, said container having therein an alloy capable of absorbing large quantities of $H_2$ gas at room temperature and at low pressures, said alloy consisting essentially of A and B where the ratio of A to B is about 1:3 to 2:17 in powder form, and A is at least one element selected from the group consisting of calcium and the rare earth elements, and B is at least one element selected from the group consisting of Ni and Co, whereby said alloy desorbs said $H_2$ therein when heated by said medium, and $H_2$ flows to said combustion chamber.

3. Apparatus according to claim 2 wherein said closed duct system comprises a plurality of ducts interconnecting said cooler, said container, and said radiator in a closed system.

4. For use with a device for converting calorific energy into mechanical energy including a combustion chamber and a cooler, and operable with a source of $H_2$ and a source of heat transfer medium, a heating system comprising a container for $H_2$ including inlet and outlet means, means for flowing said $H_2$ from the container to the combustion chamber, means for flowing said medium from the source thereof to said cooler where the medium is heated, means for flowing said heated medium to said container for heating same, means for flowing said medium from the container to said source thereof, the container having therein an alloy capable of absorbing large quantities of $H_2$ gas at room temperature and at low pressures, said alloy consisting essentially of A and B where the ratio of A to B is about 1:3 to 2:17 in powder form, and A is at least one element selected from the group consisting of calcium and the rare earth elements, and B is at least one element selected from the group consisting of Ni and Co, whereby said alloy desorbs said $H_2$ therein when heated by said medium, and $H_2$ flows to said combustion chamber.

5. Apparatus according to claim 4 wherein said alloy contains in addition at least one element selected from the group consisting of Th, Zr, and Hf.

* * * * *